United States Patent [19]

Van Sluys et al.

[11] Patent Number: 4,817,076
[45] Date of Patent: Mar. 28, 1989

[54] ELECTRO-OPTICAL SCANNING DEVICE HAVING BRIDGE MEMBERS THROUGH TRACKING COILS

[75] Inventors: Robert N. J. Van Sluys; Ghislanus M. A. M. Aldenhoven, both of Hasselt, Belgium

[73] Assignee: U.S. Philips Corp., New York, N.Y.

[21] Appl. No.: 108,511

[22] Filed: Oct. 13, 1987

[30] Foreign Application Priority Data

Oct. 13, 1986 [NL] Netherlands .................. 8602564

[51] Int. Cl.$^4$ .................................................. G11B 7/09
[52] U.S. Cl. ................................................ 369/45; 369/44; 350/247; 350/255
[58] Field of Search .......................... 369/44–46; 350/247, 252, 255

[56] References Cited

U.S. PATENT DOCUMENTS

| | | | |
|---|---|---|---|
| 4,473,274 | 9/1984 | Yano et al. | 350/255 |
| 4,566,089 | 1/1986 | Kime | 369/44 X |
| 4,571,026 | 2/1986 | Maruta | 369/44 X |
| 4,643,522 | 2/1987 | Takashima | 350/255 |
| 4,678,276 | 7/1987 | Sekimoto et al. | 350/255 X |
| 4,679,903 | 7/1987 | Kasahara et al. | 350/255 X |
| 4,687,296 | 8/1987 | Terayama et al. | 350/255 X |
| 4,694,442 | 9/1987 | Gijzen et al. | 369/44 |

FOREIGN PATENT DOCUMENTS

| | | |
|---|---|---|
| 0068757 | 1/1983 | European Pat. Off. |
| 60-22741 | 2/1985 | Japan |
| 60-98532 | 6/1985 | Japan |
| 60-127538 | 7/1985 | Japan |
| 61-45422 | 3/1986 | Japan |

OTHER PUBLICATIONS

Patent Abstracts of Japan, vol. 9, No. 246 (P-393) [1969], Oct. 3, 1985.
Patent Abstracts of Japan, vol. 7, No. 152 (P-208) [1297], Jul. 5, 1983.
Patent Abstracts of Japan, vol. 10, No. 202 (P-477) [2258], Jul. 15, 1986.
Patent Abstracts of Japan, vol. 9, No. 144 (P-365) [1867], Jun. 19, 1985.
Patent Abstracts of Japan, vol. 9, No. 289 (P-405) [2012], Nov. 15, 1985.

*Primary Examiner*—Alan Faber
*Assistant Examiner*—W. R. Young
*Attorney, Agent, or Firm*—F. Brice Faller

[57] ABSTRACT

The invention relates to an electro-optical device, comprising a frame (1), a movable holder (5) in which an objective (7) having an optical axis (9) is secured, bearing pin (25) fixed to the holder (5) and bearings (27, 29) fixed relative to the frame (1) supporting the holder so that it can be translated and rotated, a magnet (13) secured to the frame and cylindrical wall portions (1B) which wall portions with the magnet form an annular air gap (17) with a radial magnetic field. A focussing coil (19) is secured to the holder and is movable in the air gap, and a plurality of tracking coils (33) are secured to the holder and are situated on the outer side of the focussing coil. The tracking coils extend through recesses (37) between the cylindrical wall portions of the frame, the turns of the tracking coils being situated in or substantially in radial planes containing the axis of rotation (11) of the holder and the turns of each of the tracking coils together forming a continuous free space (35). Bridge members (39) of a soft-magnetic material extend through the free spaces and are magnetically linked and mechanically connected to the cylindrical wall portions on both sides of the tracking coils.

8 Claims, 2 Drawing Sheets

ELECTRO-OPTICAL SCANNING DEVICE HAVING BRIDGE MEMBERS THROUGH TRACKING COILS

BACKGROUND OF THE INVENTION

The invention relates to an electro-optical device for scanning an information tack on an information carrier. An objective having an optical axis is mounted in a holder which is movable relative to a frame plate so that the holder can be translated parallel to the optical axis and can be rotated about an axis of rotation which extends parallel to the optical axis. Bearing means support the holder relative to the frame plate and magnetic means are arranged on the frame plate surrounding the axis of rotation. At least two cylindrical wall portions are connected to the frame plate and surround said magnetic means in such a way that an annular air gap is formed between the wall portions and the magnetic means. The magnetic means and the cylindrical wall portions form part of a magnetic circuit with a radial magnetic field in the air gap. A focussing coil, which secured to the holder, which is movable in the air gap, and is arranged coaxially around the axis of rotation. At least two tracking coils are secured to the holder externally of the focusing coil and extend through recesses between said cylindrical wall portions. The turns of the tracking coils are situated in or substantially in radial planes containing the axis of rotation of the holder, the turns of each of the tracking coils together surrounding a continuous space. The focussing coil and the tracking coils, when energized, both cooperate with the magnetic circuit for controllably moving the objective.

Such a device is known from Japanese Patent Application No. 58-206142. The known device is intended for use in an optical-disc player or in another apparatus in which a light beam is focussed on the recording surface of an information carrier via an objective for the purpose of optically reading the information stored in a track on the surface. The objective is eccentrically mounted in a holder which is movable relative to the frame plate of the device. For this purpose the holder is provided with a centrally mounted bearing which is rotatable about and movable along a bearing pin secured in the frame plate. As the bearing pin extends parallel through the optical axis of the objective, focussing errors and tracking errors can be corrected by moving the holder along the bearing pin and rotating the holder about the bearing pin respectively. For driving the holder there are provided electromagnetic means, comprising coils arranged on the holder, an annular permanent magnet secured to the frame plate, and two cylindrically curved magnetically conductive wall portions arranged on the frame plate. A focussing coil is wound on a cylindrical wall of the holder to provide the axial movements of the holder and two rectangular tracking coils are cemented to the focussing coil to provide the pivotal movements of the holder. The turns of the focussing coil are coaxial with the bearing pin. The wall portions, which are diametrically spaced from each other, are each formed with a recess to provide a coil former having a free end, over which one of the tracking coils is slid. Between the free end of each coil former and the facing wall portion a free space is formed. Thus, between the magnet and the wall portions an annular air gap with a radial magnetic field is formed for cooperation with the coils, the air gap being interrupted at two locations and the radially directed magnetic field being discontinued at the location of the free spaces.

When the focussing coil is energized the holder can be moved axially for focussing the light beam on the recording surface of the information carrier. When the tracking coils are energized, which coils are movable relative to the coil formers, which extend through recesses in the cylindrical wall portions, and which may be situated partly in the free spaces, the holder can be pivoted about the bearing pin. This causes the objective to be moved substantially perpendicularly to the information track for the purpose of following the information track of the information carrier.

In the known device the magnetic circuit is asymmetrical at the location of the tracking coils. A disadvantage of this is that the flux in the coil formers is always oriented in one direction, which in the case of energizing of the tracking coils is likely to give rise to magnetic saturation, unless coil formers of comparatively large cross-section are used. This also means that large tracking coils are needed, which is undesirable for reasons of efficiency. Another disadvantage of the known device is the fairly large loss of magnetic flux at the free ends of the coil formers. A further disadvantage is that owing to the asymmetrical pattern of the magnetic lines of forces near the tracking coils the torque produced per unit of current through the tracking coils is variable, which results in a limited sensitivity of the device. Further, it is to be noted that the known construction, comprising the frame plate and the two separate cylindrical wall portions cannot readily be manufactured as a single part on account of the recesses between the coil formers and the frame plate. Therefore, the known construction is preferably manufactured by assembling the parts. However, accurately positioning these parts relative to each other is then a laborious procedure.

SUMMARY OF THE INVENTION

According to the invention, bridge members of a soft-magnetic material extend through the continuous spaces inside the tracking coils and provide the magnetic linkage with the cylindrical wall portions at both sides of each of the tracking coils.

As a result of the presence of the bridge members in the device, the annular air gap with the radial magnetic field can surround the axis of rotation essentially without any discontinuity. This has a favourable influence on the efficiency of the focussing drive. The tracking coils are suitably thin and are preferably of rectangular cross-section, so that they can be manufactured simply. The tracking coils each have an active coil section which extends parallel to the axis of rotation through a part of the air gap formed between the magnetic means and one of the bridge members. The magnetic flux lines then extend perpendicularly to the active coil sections, the magnetic flux being guided to the cylindrical wall portions of the magnetic circuit along two paths via the bridge members. The magnetic circuit which extends in the tangential direction at the location of the tracking coils provides a substantial increase in sensitivity of the device and reduces the likelihood of local magnetic saturation in the magnetic circuit, enabling a lighter construction to be used. The coil sections of the tracking coils which extend outside the air gap are hardly influenced by the magnetic field produced by the magnetic means, because there is hardly any magnetic stray field in the space around the air gap. This enables a high-efficiency tracking drive to be obtained. The recesses between the cylindrical wall portions are dimensioned in such a way that as the holder is moved for the purpose of focussing and tracking the tracking coils do not contact the wall portions. During normal use the device does not present any crosstalk problems, because the turns of the tracking coils are situated in radial planes so that in the radial magnetic field no magnetic forces parallel to the axis of rotation can arise and influence the tracking coils. Therefore, the number of tracking coils may readily be limited to two, the tracking coils being arranged diametrically for reasons of symmetry.

In a favorable embodiment the bridge members are strip-shaped and are arranged on mounting surfaces of the cylindrical wall portions. During manufacture of the device the bridge members are suitably mounted together with the tracking coils after the holder has been fitted, by passing the members through the tracking coils and subsequently positioning them on the mounting surfaces, preferably on the outer sides of the cylindrical wall portions. The bridge members may be secured to the mounting surface by means of an adhesive.

The cylindrical wall portions preferably form an integrated unit with the frame plate. This embodiment has a frame which, in principle, can be formed in one production step, for example by sintering, and which comprises a frame plate and cylindrical wall portions. Such a frame can be manufactured within tight tolerance margins without extra costs.

Another suitable embodiment of the invention, which is of particularly simple construction and can be manufactured cheaply, is characterized in that the magnetic means comprise a disc-shaped or cylindrical axially magnetized magnet and a disc-shaped element of a ferro-magnetic material secured thereto.

Suitably, the magnetic is made of a high-grade magnetic material such as a neodymium-iron-boron or samarium-cobalt.

European Patent Application No. 0,068,757 discloses a device for electro-optically scanning an information track on an information carrier in which an optical lens having an optical axis is mounted in a holder which is movable relative to a frame so that the holder can be translated parallel to the optical axis and can be rotated about an axis of rotation which extends parallel to the optical axis bearing means support the holder relative to the frame and magnetic means are secured to the frame surrounding the axis of rotation. A cylindrical wall of the frame surrounds the magnetic means in such a way that an annular air gap is formed between the wall and the magnetic means. The magnetic means and the cylindrical wall form part of a magnetic circuit with a radial magnetic field in the air gap. A focussing coil secured to the holder is movable in the air gap, and is arranged coaxially around the axis of rotation. A plurality of tracking coils are secured to the holder externally of the focussing coil and are situated near recesses in the cylindrical wall. The focussing coil and the tracking coils, when energized, both cooperate with the magnetic circuit for controllably moving the optical lens.

The optical lens of this known device is eccentrically mounted in a holder which is movable relative to the frame of the device. For this purpose the holder is provided with a centrally mounted bearing which is rotatable about and movable along a bearing pin secured in the frame. As the bearing pin extends parallel through the optical axis of the optical lens focussing errors and tracking errors can be corrected by moving the holder along the bearing pin and rotating the holder about the bearing pin respectively. For driving the holder there are provided electromagnetic means, comprising coils arranged on the holder, an annular permanent magnet secured to the frame, and magnetic yokes belonging to the frame. The coils comprise a focussing coil wound on a cylindrical wall of the holder to provide the axial movements of the holder and two or more rectangular tracking coils which are bent to assume the shape of the cylindrical wall and which are cemented to the focussing coil to provide the pivotal movements of the holder. The turns of the focussing coil are coaxial with the bearing pin and the turns of the tracking coils are arranged in accordance with cylindrical surfaces which are concentric with the bearing pin. The magnetic yokes are situated partly inside and partly outside the cylindrical wall of the holder, the yoke portion situated outside the holder having a cylindrical wall in which a plurality of recesses corresponding to the number of tracking coils are formed. Between the magnet and the magnetic yokes an annular air gap with a radial magnetic field is formed for cooperation with the coils, the gap and hence the radially directed magnetic field being discontinued at the location of the recesses.

When the focussing coil is energized the holder can be made axially for focussing the light beam on the recording surface of the information carrier. When the tracking coils are energized, which coils each comprise two vertical coil sections which extend parallel to the bearing pin, one of the coil sections being disposed in the air gap and the other coil section being disposed in an air-gap discontinuity, the holder can be pivoted about the bearing pin. This causes the optical lens to be moved substantially perpendicularly to the information track for the purpose of following the information track of the information carrier.

A drawback of this known device is that when the tracking coils are energized magnetic stray fields in the air-gap discontinuities subject the vertical coil sections disposed in the air gap to counteracting magnetic forces. This results in additional power being required for driving the tracking coils, which is undesirable for reasons of efficiency. Moreover, it is generally desirable to minimize the power in view of the heat dissipation in the coils and the dimensioning of the required electric circuity. Another disadvantage of this known device is the intricate construction as a result of the presence of a plurality of magnetic yokes and a plurality of bent tracking coils. A further disadvantage, which occurs when only two tracking coils are employed, is that crosstalk arises between the drive of the tracking coils and the drive of the focussing coils. When only two tracking coils are utilized and these coils are energized, a resultant axial magnetic force is generated in the horizontal coil sections of the tracking coils. This problem is overcome by the use of four tracking coils but the use of more parts leads to higher production costs.

DETAILED DESCRIPTION OF THE PREFERRED EMBODIMENT

Figure 1:
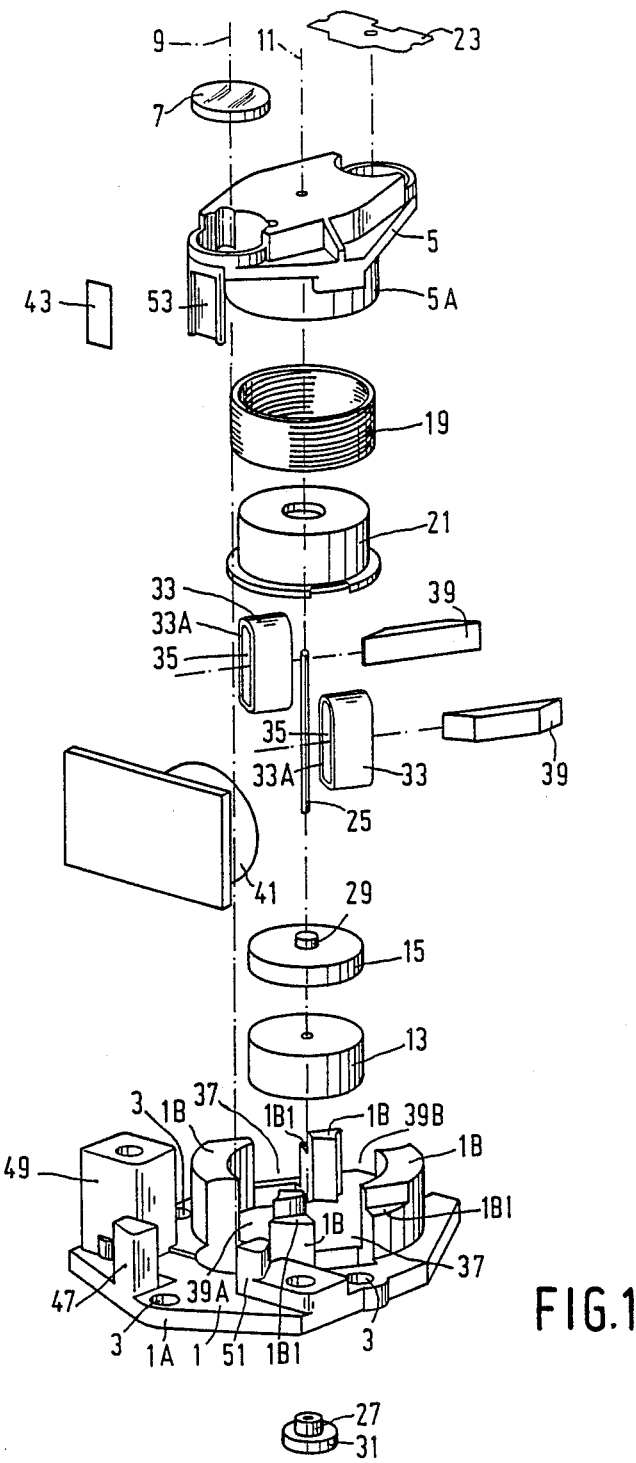
FIG. 1 is an exploded perspective of the electro-optical device.
Figure 2:
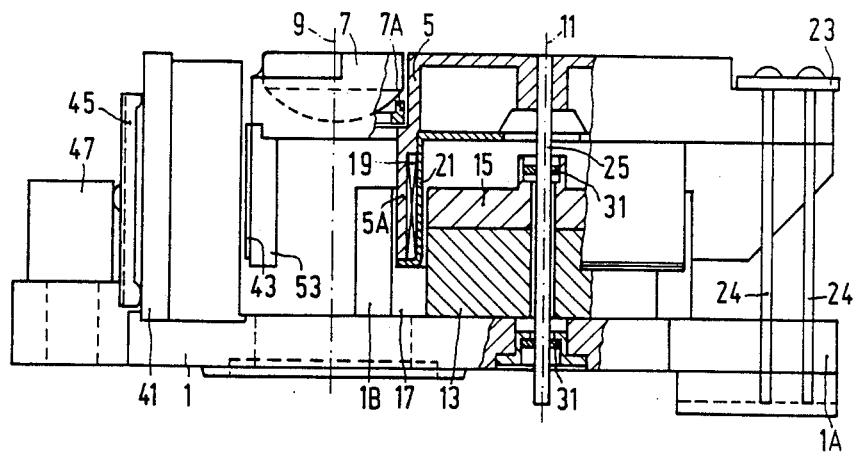
FIG. 2 is a partly sectioned side view.
Figure 3:
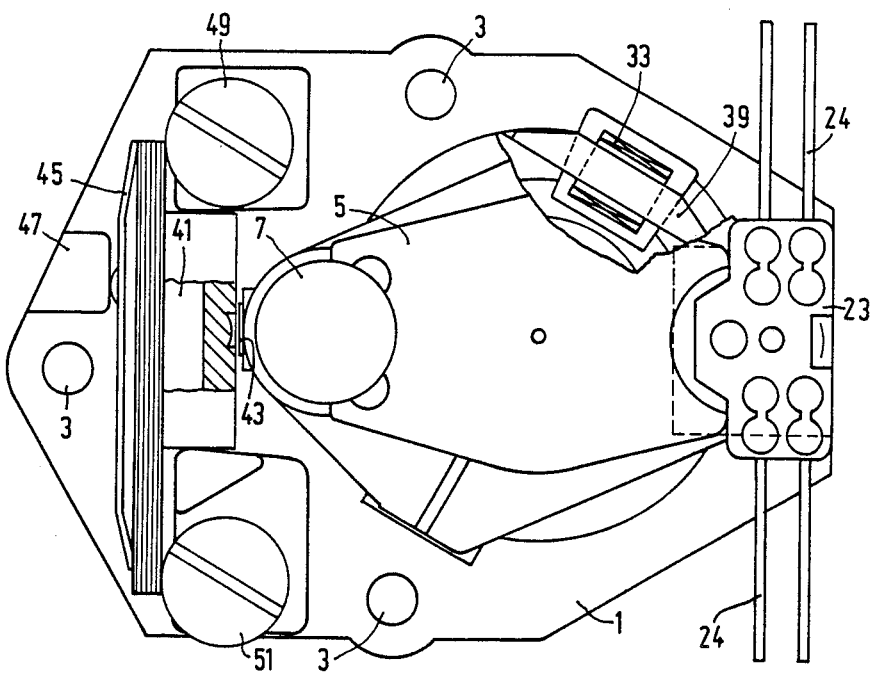
FIG. 3 is a partly sectioned plan view.

The electro-optical device in accordance with the invention shown in FIGS. 1, 2 and 3 is suitable for use in an optical-disc player by means of which optical audio discs and/or optical video discs or optical data discs can be inscribed and/or read. Optical-disc players are known per se and will not be described in more detail. Such a disc player is described in European Patent Application No. EP 0,196,691, to which U.S. Pat. No. 4,694,442 corresponds, herewith incorporated by reference. reference).

The device shown comprises a frame 1 of a soft-magnetic material, such as sintered iron, the frame 1 comprising a frame plate 1A, by means of which the frame can be secured to the relevant parts of a disc player, and two upright cylindrical wall portions 1B. The frame plate 1A is provided with mounting holes 3. The device further comprises a holder 5 which is made of, for example a synthetic material, such as polycarbonate or nylon reinforced with glass fibres or carbon fibres, and which accommodates an objective 7. The objective 7, which may comprise one lens or a plurality of lenses and which is provided with a diaphragm 7A, has an optical axis 9. The objective 7 serves for focussing a light beam emitted by a radiation source, for example a semiconductor laser, on the recording surface of a rotating optical disc under normal operating conditions and maintaining this beam in focus. For this reason the objective 7 is required to be capable of performing limited movements along its optical axis 9, referred to hereinafter as focussing movements. Focussing is effected by moving the holder 5 together with the objective 7 parallel to the optical axis 9.

In addition to focussing movements the objective 7 should be capable of performing movements to bring and maintain the focussed radiation beam in desired positions relative to the recording surface of a rotating optical disc. Since the information stored in the recording surface is arranged in a spiral track these movements are also referred to as radial and tangential tracking movements. For the purpose of radial tracking the electro-optical device can be arranged in a manner known per se on a slide of an optical-disc player, which slide, viewed from the axis of rotation of the optical disc, can perform a radial rectilinear movement. Such a construction is described in U.S. Pat. No. 4,694,442. On account of the comparatively large mass of the slide by means of which the electro-optical device can be moved in a radial direction, the electro-optical device can only roughly follow the track in the radial direction by means of rectilinear movements of the slide. Accurate radial tracking can be achieved by means of the inventive electro-optical device, namely by rotating the holder 5 together with the objective 7, through a limited angle about an axis of rotation 11 which extends parallel to the optical axis 9. Tracking in the tangential direction, to provide corrections for timing errors, can be achieved by the used of electronic delay means.

For driving the holder 5 in order to perform these radial movements, the device has electromagnetic drive means, of which a first part is secured to and forms a part of the frame 1 and of which a second part and a third part are secured to the holder 5. The first part includes a cylindrical permanent magnet 13 which is mounted on the basic part of the frame 1 and which has a magnetic axis which coincides with the axis of rotation 11, a disc 15 of ferromagnetic material secured to the magnet 13, and a magnetic yoke which together with the magnet 13 and the disc 15 constitutes a magnetic circuit. The magnetic yoke is formed by the frame plate 1A and the cylindrical wall portions 1B of the frame 1, an annular air gap 17 being formed between the magnet 13 and the disc 15 on the one hand and the wall portions 1B on the other hand, in which gap a radially directed magnetic field exists.

The second part of the electromagnetic drive means comprises a cylindrical focussing coil 19 arranged in the holder 5, whose coil axis coincides with the axis of rotation 11 of the holder 5. In the present example the focussing coil 19 is wound on a sleeve 21 which is made of, for example, aluminium and which is secured in the holder 5 by means of an adhesive, the leads of this coil being electrically connected to a printed circuit board 23 secured to the holder 5. The focussing coil 19, together with the sleeve 21 and a cylindrical portion 5A of the holder 5, is freely movable in the air gap 17. For this purpose the device is provided with bearing means comprising a metal bearing pin 25 secured to the holder 5 and two bearings 27 and 29. The bearings 27 and 29, which are made of, for example sapphire, are secured to the frame plate 1A and the disc 15 respectively by means of resilient fixing elements 31. The bearings pin 25 is slidable and rotatable in the bearings 27 and 29. When the focussing coil 19 is energized it experiences a resultant magnetic force which is directed parallel to the optical axis 9 in order to move the holder 5 along the axis of rotation 11 for the purpose of focussing.

The third part of the electric magnetic drive means includes two tracking coils 33 of rectangular cross-section. The two tracking coils 33 are diametrically secured to the outer side of the cylindrical portion 6A of the holder 5, for example by means of an adhesive. The tracking coils 33 are disposed so that their coil axes are tangent to an imaginary circle which is concentric with the focussing coil 19, so that the turns of the tracking coils 33, which surround free spaces 35, are situated in or substantially in planes containing the axis of rotation 11. The leads of the tracking coils 33, as well as those of the tracking coil 19, are connected to printed circuit board 23, which can be connected to a focussing and tracking system of an optical-disc player by means of electrical leads 24.

Between the two cylindrical wall portions 1B two openings or recesses 37 are formed through which the tracking coils 33 extend. On opposite sides of the recesses 37 the wall portions 1B are formed with mounting surfaces 1B1 on which bridge members 39 of a soft magnetic material, such as soft iron or sintered iron, are arranged in the assembled condition of the device. The bridge members 39, which are secured to the wall portions 1B, for example by means of an adhesive, extend through the spaces 35 in the tracking coils 33 and ensure that the active coil portions 33A of the tracking coils are situated in a radial magnetic field. Thus, when the tracking coils 33 are energized tangentially directed resultant magnetic forces are generated to cause the holder 5 to be rotated about the axis of rotation 11. The recesses 37 and the bridge members 39 are dimensioned in such a way that during normal use the tracking coils 33 cannot contact the cylindrical wall portions 1B and the bridge members 39.

The presence of the bridge members 39 in principle enables an uninterrupted annular air gap to be formed. However, in view of the dimensions of the device it may be desirable to make the distance between the optical axis 9 and the axis of rotation 11 so small that the objective 7 would collide with one of the cylindrical wall portions 1B, as is the case in the embodiment shown in FIGS. 1, 2 and 3. However, this is precluded by providing a small opening 39A in the relevant cylindrical wall portion 1B. Moreover, in the present embodiment a similar opening 39B is formed near the balancing weight of the holder 5, which balancing weight is constituted by the printed circuit board 23. Although the air gap 17 is locally interrupted by the openings 39A and 39B, it has been found that these interruptions hardly affect the correct operation of the device.

For measuring the radial position of the objective during operation, the device further comprises a detector 41 and a mirror 43 which cooperates therewith. The detector 41, which comprises a printed circuit board, a LED and a lens, is secured to the frame 1 by means of a leaf spring 45. The leaf spring 45 acts against a raised portion 47 of the frame 1, whilst the detector is positioned against two adjustable elements 49 and 51 which are secured to the frame 1. The mirror 43 is secured to a mirror support 53 of the holder 5.

For completeness' sake it is to be noted that the invention is not limited to the embodiment described herein. For example, the distance between the optical axis and the axis of rotation may be increased to form an uninterrupted annular air gap. Within the scope of the invention it is also possible to employ more tracking coils or other magnetic means.

What is claimed is

1. An electro-optical device for scanning an information track on an information carrier, comprising
    a frame plate,
    a holder which is movable relative to the frame plate and in which an objective having an optical axis is mounted, which holder can be translated parallel to the optical axis and can be rotated about an axis of rotation which extends parallel to the optical axis,
    bearing means for supporting the holder relative to the frame plate,
    magnetic means which are arranged on the frame plate and which surround the axis of rotation and at least two cylindrical wall portions which are connected to the frame plate and which surround said magnetic means in such a way that an annular air gap is formed between said wall portions and the magnetic means, the magnetic means and the cylindrical wall portions forming part of a magnetic circuit with a radial magnetic field in said air gap,
    a focussing coil which is secured to the holder, which is movable in the air gap, and which is arranged coaxially around the axis of rotation, and
    at least two tracking coils which are secured to the holder and which extend through recesses between said cylindrical wall portions and are situated externally of the focussing coil, the tracking coils having turns situated in radial planes containing the axis of rotation of the holder, the turns of each tracking coil surrounding a continuous space, and the focussing coil and the tracking coils, when energized, both cooperating with the magnetic circuit for controllably moving the objective, characterized in that
    bridge members of a soft-magnetic material extend through respective said continuous spaces to magnetically link the cylindrical wall portions at both sides of each of the tracking coils.

2. An electro-optical device as claimed in claim 1, characterized in that the bridge members are strip-shaped and are arranged on mounting surfaces of the cylindrical wall portions.

3. An electro-optical device as claimed in claim 1, characterized in that the cylindrical wall portions form an integrated unit with the frame plate.

4. An electro-optical device as claimed in claim 1, characterized in that the magnetic means comprise a disc-shaped or cylindrical axially magnetized magnet and a disc-shaped element of a ferromagnetic material secured thereto.

5. Optical disc player provided with an electro-optical device as claimed in claim 1.

6. Optical disc player as in claim 5 wherein the bridge members are strip-shaped and are arranged on mounting surfaces of the cylindrical wall portions.

7. Optical disc player as in claim 5 wherein the cylindrical wall portions form an integrated unit with the frame plate.

8. Optical disc player as in claim 5 wherein the magnetic means comprise a disc-shaped or cylindrical axially magnetized magnet and a disc-shaped element of a ferromagnetic material secured thereto.

* * * * *